(12) United States Patent
Zakryk et al.

(10) Patent No.: US 6,779,358 B2
(45) Date of Patent: *Aug. 24, 2004

(54) WATER COLLECTION AND DISPENSING MACHINE

(75) Inventors: John M. Zakryk, Plantation, FL (US); John Kopec, Margate, FL (US)

(73) Assignee: International Water Makers, Inc., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/955,571

(22) Filed: Sep. 18, 2001

(65) Prior Publication Data

US 2003/0094011 A1 May 22, 2003

(Under 37 CFR 1.47)

Related U.S. Application Data

(63) Continuation-in-part of application No. 09/490,858, filed on Jan. 24, 2000, now Pat. No. 6,289,689, which is a continuation-in-part of application No. 09/133,694, filed on Dec. 30, 1997, now Pat. No. 6,029,461.

(51) Int. Cl.[7] .............................................. F25D 21/14
(52) U.S. Cl. .............................. 62/291; 62/317; 62/318
(58) Field of Search ......................... 62/291, 317, 318, 62/93

(56) References Cited

U.S. PATENT DOCUMENTS

| | | | |
|---|---|---|---|
| 3,594,675 A | | 7/1971 | Willson |
| 3,675,442 A | | 7/1972 | Swanson |
| 4,182,132 A | | 1/1980 | Nasser et al. |
| 4,255,937 A | | 3/1981 | Ehrlich |
| 5,058,195 A | | 10/1991 | Knepler |
| 5,106,512 A | | 4/1992 | Reidy |
| 5,149,446 A | | 9/1992 | Reidy |
| 5,203,989 A | | 4/1993 | Reidy |
| 5,259,203 A | | 11/1993 | Engel et al. |
| 5,555,732 A | | 9/1996 | Whiticar |
| 5,669,221 A | | 9/1997 | LeBleu et al. |
| 6,289,689 B1 | * | 9/2001 | Zakryk ........................ 62/291 |

* cited by examiner

*Primary Examiner*—William C. Doerrler
(74) *Attorney, Agent, or Firm*—Malloy & Malloy, P.A.

(57) ABSTRACT

A water collection and dispensing machine having a primary housing with an air inlet and an air outlet, an air blower structured to draw air into the primary housing through the air inlet and push air out of said primary housing through the air outlet. The water collection and dispensing machine further includes an evaporator coil structured to cycle a cold refrigerant liquid therethrough, the evaporator coil being disposed in line with the air inlet so that the air drawn into the primary housing through the air inlet passes thereover and moisture therefrom condenses on an exterior surface of the evaporator coil so that it may be collected in the form of water droplets, filtered to eliminate contaminants, and dispensed for convenient consumption by a user.

12 Claims, 4 Drawing Sheets

WATER COLLECTION AND DISPENSING MACHINE

CLAIM OF PRIORITY

The present application is a Continuation-In-Part application of previously filed, now application having Ser. No. 09/490,858 which was filed on Jan. 24, 2000, which is set to mature into U.S. Pat. No. 6,289,689 on Sep. 18, 2001 which is a Continuation-In-Part of U.S. patent application having Ser. No. 09/133,694 filed Dec. 30, 1997; also incorporated herein by reference, which matured into U.S. Pat. No. 6,029,461 on Feb. 29, 2000.

BACKGROUND OF THE INVENTION

1. Field of the Invention

The present invention relates to a water collection and dispensing machine which is capable of effectively and efficiently collecting drinkable water from the atmosphere in an assembly that is substantially compact and quiet, yet capable of producing sufficiently large quantities of water to satisfy normal consumption requirements, and in an assembly that is substantially durable and free from malfunction, such as those related to excess moisture and icing.

2. Description of the Related Art

The availability of fresh, purified drinking water is highly desirable in virtually every environment and circumstance. For example, individuals in homes and offices often install complex and expensive filtration systems, or buy small individual bottles of spring water for personal consumption purposes. One of the most common manners in which purified drinking water is made available, however, involves the utilization of large 5-gallon water bottles in conjunction with a cooler assembly.

While the use of the larger bottles with a cooler is generally more convenient to implement than other methods of providing purified water, anyone who has been charged with the task of replacing an empty water bottle is very aware of the difficulties and inconveniences associated with the use of conventional bottled water cooler systems. First of all, the large bottles of water are generally heavy, and as such, quite difficult for any person to lift and position atop of the cooler. Moreover, the bottle must not merely be lifted onto a top of the cooler, but rather, it must be turned upside-down, with the spout open, so as to permit for the availability of the water contained therein. Inevitably, individuals changing the water bottle spill quantities of water, which may be hazardous and make for a slippery environment, or end up getting hurt while changing the bottle due to the heavy weight that must be manipulated.

In addition to the substantial difficulties associated with reloading conventional water coolers, the cost associated with the frequent purchase of the large bottles can add up and become quite expensive, especially when aggregated with the electrical cost associated with operating the cooler. Further, if limited space is available, the large inverted water bottle, which has a generally unattractive appearance, takes up a lot of excess space and will generally not permit the use of the space over the water cooler for alternative purposes.

As such, it would be highly beneficial to provide a water cooler type assembly which is capable of providing sufficient quantities of purified, drinkable water, without requiring that a large water bottle be implemented to supply the water. Such a device would preferably take up less space, would be more cost effective, would not require water bottle replacement, and would not require frequent water deliveries to ensure that water is always available for drinking purposes. Indeed, such a device would be highly beneficial in environments when drinking water is scarce or otherwise not available.

In the past, others have attempted to provide various complex and elaborate mechanisms for producing potable water from the atmospheric air. Generally, such devices are designed for use at locations where the water supply is limited and individuals need drinking water to survive. As a result, cost, size, noise, and other ergonomic features which would make the devices convenient for use on an everyday basis are not primary considerations in their design. Accordingly, such devices could not be effectively utilized in a home or office setting in order to practically and effectively replace the use of conventional bottled water coolers.

In addition to those larger, highly complex devices, other devices for the extraction of potable water from the atmosphere such as that disclosed in the patent to Engel et al. (U.S. Pat. No. 5,259,203) have attempted to provide a more readily useable device. Such devices, however, still do not achieve maximum efficiency and effectiveness for use and are not as suited for use in an office or home environment. For example, such devices generally rely on a gravity feed, and as a result must be mounted in a generally elevated orientation to permit effective access to a spigot thereof. Moreover, fluid which is ready to be dispensed may remain within dispensing tubing or a reservoir for extended periods of time and as a result, may become stagnate or otherwise contaminated. Additionally, such devices often have limited capacity and are quite noisy which tends to diminish their desirability of use within an office or home environment.

A further drawback associated with existing devices is their susceptibility to malfunction, such as from corrosion or internal icing. For example, the nature of these types of devices provides that large quantities of moisture are formed and collect internally, especially if cooling is involved. Unfortunately, all of the moisture does not form in the desired collection areas and as a result internal electrical components and other components are susceptible to corrosion, water damage and or contamination from stagnant moisture build ups. Moreover, if the temperature within these devices is not regulated effectively and accurately, internal icing can result when attempting to maintain the water at a desired, cool drinking temperature.

There therefore still a substantial need in the art for an effective and efficient water cooling type system which has a sufficient water capacity for effective use, maintains water fresh and readily available at all times without contamination and at a desirable cooled temperature, is substantially inexpensive to operate, and is conveniently useable in a home or office environment as a result of its compact nature, relatively quiet operation, and convenient dispensing. Moreover, such a device should be relatively free from corrosion or internal icing and should be configured so as to facilitate the maintenance of maximum purification conditions at all times.

SUMMARY OF THE INVENTION

The present invention is directed towards a water collection and dispensing machine structured to provide a quantity of purified, drinkable water, for convenient consumption. The water collection dispensing machine includes a primary housing, which is preferably somewhat compact and has an air inlet and an air outlet. Specifically, the air outlet is preferably disposed at generally a bottom of the housing to provide for convenient, out of the way release of air therethrough. Further, the water collection and dispensing machine includes an air blower. The air blower is structured to draw air into the primary housing through the air inlet, and thereby create a positive pressure condition within the primary housing. That positive pressure that is created within the primary housing in turn pushes air through the primary housing and down and out of it through the air outlet in a relatively quiet fashion.

Additionally, the water collection and dispensing machine includes a dehumidifier refrigerant assembly. Specifically, the dehumidifier refrigerant assembly is structured and disposed to convert a refrigerant gas into a cold refrigerant liquid. That cold refrigerant liquid is then to be cycled through an evaporator coil disposed within the primary housing. The evaporator coil is specifically structured so that the air that is drawn into the primary housing through the air inlet will pass thereover as it flows through the primary housing to the air outlet. As a result, moisture from the air passing over the evaporator coil condenses on an exterior of the coil where it can be collected, in the form of water droplets, by a fluid collection assembly. Preferably, the fluid collection assembly includes a fluid reservoir wherein a substantial amount of water is contained for dispensing.

Furthermore, the water collection and dispensing machine may include a cooling assembly. Specifically, the cooling assembly is structured to cool the water contained in the fluid reservoir to a predetermined cooled temperature. Moreover, so as to identify a temperature of that water, a temperature detection assembly is provided and functions to direct a cooling operation of the cooling assembly. The temperature detection assembly itself includes a detection head that is structured to be immersed within the water contained in the fluid reservoir, thereby providing a substantially accurate temperature identification. Moreover, the temperature detection assembly includes a shielding assembly which communicably shields the detection head from contact with the water, and thereby protects the detection head from rusting or deteriorating into the water, while still permitting a temperature of the water to be identified.

Preferably, the water collection and dispensing machine also includes a filtration assembly. Specifically, the filtration assembly is structured to filter the collected water prior to dispensing. Moreover, the filtration assembly of the present invention includes a pump structured to draw water from the fluid reservoir, a water filter structured to receive the water therethrough for filtration, and an insulation assembly. The insulation assembly is structured to enclose and insulate the pump and water filter from condensation and moisture, thereby preventing rusting and deterioration thereof.

It is an object of the present invention to provide a water collection and dispensing machine which accurately and efficiently maintains drinking water at a predetermined cooled temperature, with minimal risk of internal icing or water contamination due to corrosion and the like.

An added object of the present invention to provide a water collection and dispensing machine which isolates excess moisture and condensation from internal components which are susceptible to corrosion and deterioration as a result of the moisture.

Also an object of the present invention is to provide a water collection and dispensing machine which provides for facilitated repair and replacement of filtration components, thereby minimizing a risk of long term malfunction and maximizing the purity of the dispensed water by facilitating the maintenance of fresh filtration cartridges.

Another object of the present invention to provide a water collection and dispensing machine which has increased fluid retention capacity and is convenient to utilize in a work or home environment.

A further object of the present invention is to provide a water collection and dispensing machine which is substantially compact and quiet during operation.

Still another object of the present invention is to provide a water collection and dispensing machine that does not require the use of large water bottles while still providing sufficient quantities of fluid for normal consumption.

Yet another object of the present invention is to provide a water collection and dispensing machine which maintains water to be dispensed cool without requiring a second refrigerant system.

A further object of the present invention is to provide a water collection and dispensing machine which effectively circulates water therethrough to ensure that water to be dispensed is not stale and has not remained stagnate for extended periods of time.

Also an object of the present invention is to provide a water collection and dispensing machine which dispenses substantially clean, purified water without requiring connection with a conventional water source such as a tap or water bottle in order to provide quantities of purified water.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
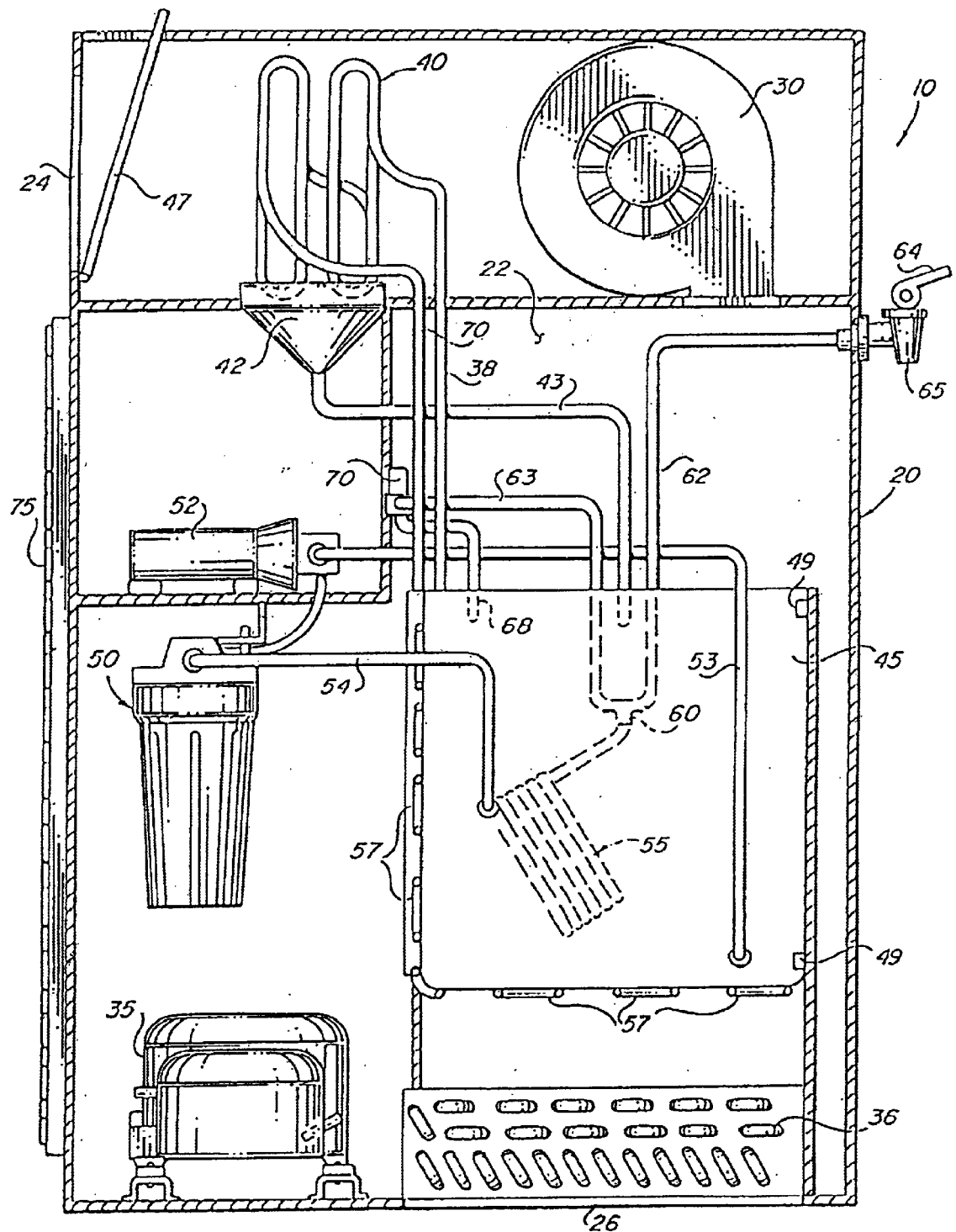
FIG. 1 is a front cross-sectional view of the water collection and dispensing machine of the present invention.
Figure 2:
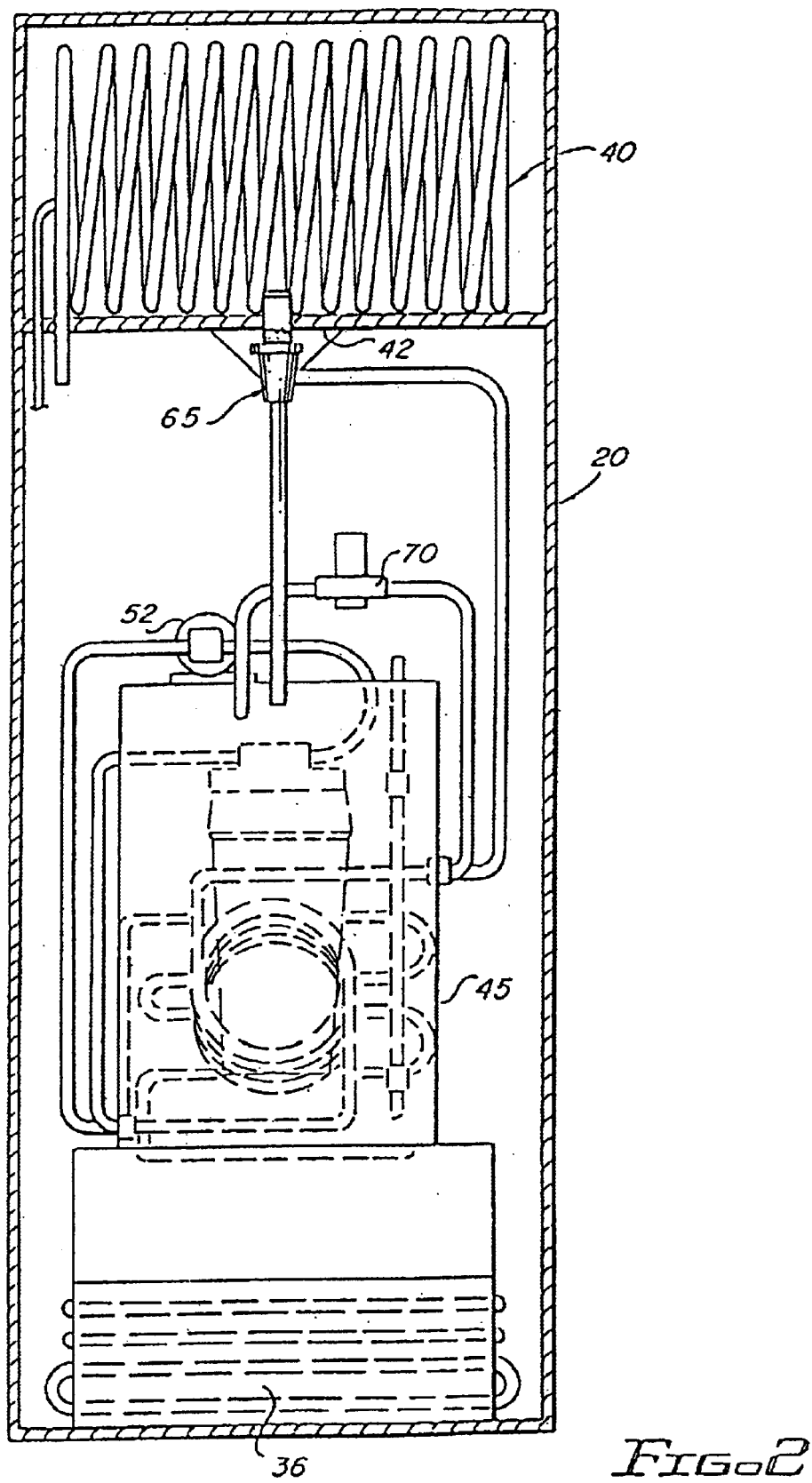
FIG. 2 is a side cross-section view of the water collection and dispensing machine of the present invention.

The present invention is directed towards a water collection and dispensing machine, generally indicated as 10. In particular, the water collection and dispensing machine 10 is structured to draw in atmospheric air, and convert the humidity contained therein into purified, drinkable water. As such, included as part of the water collection and dispensing machine 10 is a primary housing 20. This primary housing 20, which may be formed of aluminum, plastic or any other suitable, rigid or semi-rigid material is preferably somewhat compact and contains the remaining components of the water collection and dispensing machine 10 conveniently therein. Accordingly, the primary housing 20 provides the attractive exterior appearance for the water collection and dispensing machine 10 and its finished and compact nature facilitates the positioning of the water collection and dispensing machine 10 in a convenient, out of the way, space maximizing location.

The primary housing 20, which preferably includes a rectangular type configuration, includes generally an open interior area 22, an air inlet 24, and an air outlet 26. In use, air is structured to flow into the primary housing 20 through the air inlet 24, pass through the interior area 22 and exit through the air outlet 26. Further, in the preferred embodiment, the air inlet is disposed generally at an upper, rear portion of the primary housing 20, such as at a side of the primary housing 20 facing a wall against which the primary housing 20 is disposed. Accordingly, air can effectively be drawn into the primary housing 20 through the rear thereof, while still achieving generally quiet introduction of the air into the primary housing 20 as the noise at the air inlet is directed towards a wall and is thereby somewhat muffled.

Furthermore, in the preferred embodiment, the air outlet 26 is disposed at a base or bottom portion of the primary housing 20. As such, the air drawn in through the air inlet 24 flows completely through the primary housing 20 and can be efficiently utilized for a variety of functions without requiring significant redirection of its flow, and the air exiting the primary housing 20, which is generally somewhat warm, is more readily dissipated beneath the primary housing 20. Further, much like results with the positioning of the air inlet 24 towards a wall surface, the positioning of the air outlet 26 generally against the floor on which the primary housing 20 is disposed functions to somewhat muffle noises within the primary housing 20 and helps to contribute to the overall quite operation of the water collection and dispensing machine 10.

Disposed within the primary housing 20 and structured to draw air from the atmosphere into the primary housing 20 is an air blower 30. The air blower 30 may be any conventional type of extractor type blower which draws the air into the primary housing 20 through the air inlet 24, and in turn creates a positive pressure condition within the interior 22 of the primary housing 20. It is that positive pressure that pushes the air back out through the air outlet 26 against the floor, and further facilitates the exceptionally quite operation of the water collection and dispensing machine 10.

Further contained within the primary housing 20 is a dehumidifier refrigerant assembly. The dehumidifier refrigerant assembly is specifically structured and disposed to convert a refrigerant gas into a cold refrigerant liquid. As such, in the preferred embodiment the dehumidifier refrigerant assembly includes a compressor 35. The compressor 35 is structured to compress a refrigerant gas contained therein and thereby form a very hot gas. This very hot gas is then transferred into a condenser coil 36. The condenser coil 36 receives the hot gas from the compressor 35 and is disposed directly in-line with the air outlet 26 so that cooled air which exits the primary housing 20 through the air outlet 26 necessarily passes over the condenser coil 36. As a result, a substantial quantity of heat is drawn off of the condenser coil 36 by the cool air flow, resulting in the cooling of the very hot gas into a cool liquid. Further connected with the condenser coil 36 as part of the dehumidifier refrigerant assembly is a cap tube 38, or optional TXV. The cap tube 38 is connected in fluid flow communication with the condenser coil 36 and permits the cooled liquid to further expand as it flows therethrough and accordingly create a cold liquid. The cold liquid then flows from the cap tube 38 into an evaporator coil 40.

Looking specifically to the evaporator coil 40, it is preferably a fin and tube evaporator coil connected in fluid flow communication with the cap tube 38 and structured to cycle the cold liquid therethrough. As a result of this specific structure of the fin and tube evaporator coil 40, the cold refrigerant liquid is maintained therein for a substantial period of time and the overall exterior surface area of the evaporator coil 40 is maximized. Preferably, the fin and tube evaporator coil 40 is formed of a metallic material, such as copper so that the cold liquid flowing therethrough makes the surface of the evaporator coil 40 substantially cold as well. Moreover, the evaporator coil 40 is preferably disposed in line with the air inlet 24 in the primary housing 20. As such, upon air being drawn into the primary housing 20 by the air blower 30 it passes over the evaporator coil 40. Due to the cold temperature of the evaporator coil 40, as the air flow comes into contact with the exterior surface thereof, moisture contained within the air condenses on the evaporator coil 40 in the form of water droplets.

Disposed beneath the evaporator coil 40, and preferably included as part of the fluid collection assembly of the present invention, is a drip tray 42. The drip tray 42 is disposed beneath an entire surface of the evaporator coil 40 such that as the moisture, which was collected from the air on the exterior surface of the evaporator coil 40 drips down from the evaporator coil in the form of the water droplets, those water droplets are collected by the drip tray 42. The drip tray 42 is in turn connected by an elongate fluid conduit 43 with a generally large fluid reservoir 45. The fluid reservoir 45 preferably has a somewhat large capacity to ensure that sufficient quantities of water are available for dispensing purposes. Also, the fluid reservoir 45 can be disposed in line with the air flow passing through the primary housing 20 such that the air, which has been cooled as it passed over the evaporator coil 40, can function to cool the water within the fluid reservoir 45.

Figure 3:
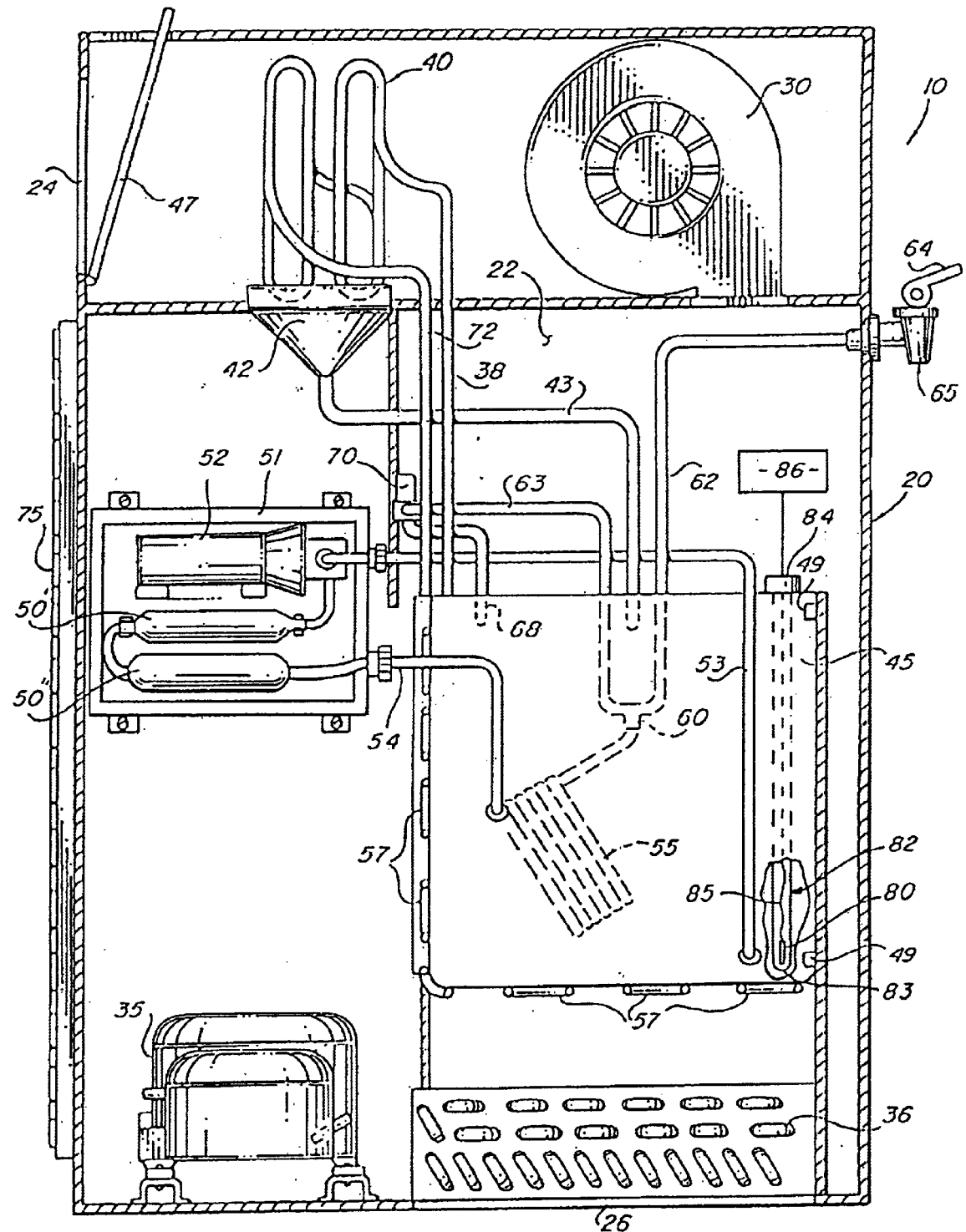
FIG. 3 is a front cross-sectional view of an embodiment of the water collection and dispensing machine of the present invention.
Figure 4:
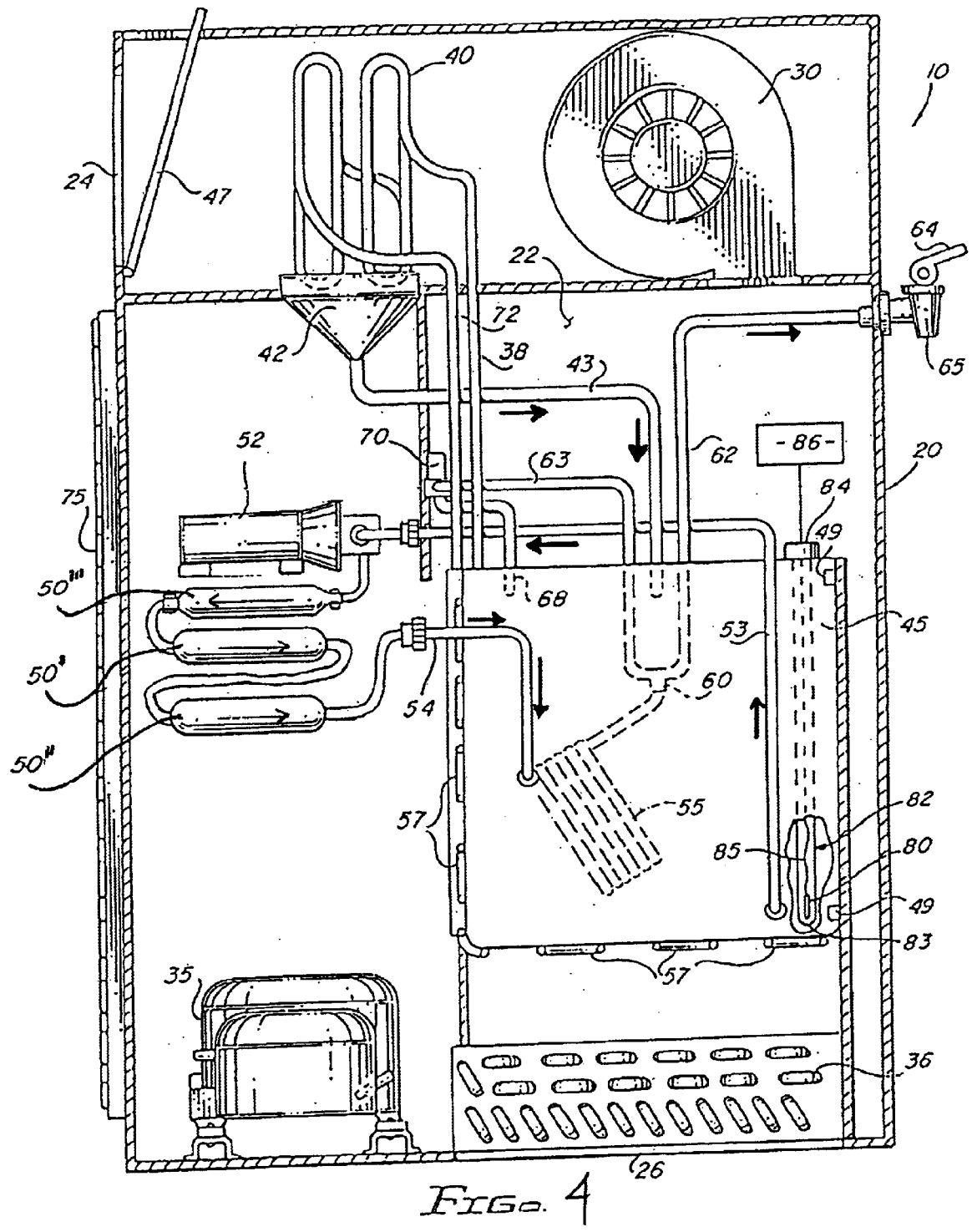
FIG. 4 is a front cross-sectional view of another embodiment of the water collection and dispensing machine of the present invention.

In order to provide purified, drinkable water for consumption by individuals, the water collection and dispensing machine 10 further includes filtration assembly. The filtration assembly is structured to ensure that all of the water collected is free from contaminants, which may be present in the air as it enters the primary housing 20. In this regard, and as an initial means of filtration, an air intake filter 47 is disposed generally over the air inlet 24. Accordingly, utilizing the air inlet filter 47 a substantial amount of particulates are removed from the air, thereby minimizing the contaminants which will be present in the water droplets which are drawn from the air. Still, however, as the water is collected in the drip tray 42 and passed into the fluid reservoir 45, some contaminates may still be present within the water. As a result, the filtration assembly of the present invention further includes a water filter 50 contained within the primary housing 20. The water filter 50 is structured to receive water therethrough as a result of a pump 52 also contained within the primary housing 20. In particular, the pump 52 through an elongate conduit 53 draws water from the fluid reservoir 45 and pumps it into the water filter 50. The water filter 50 itself may include any kind of conventional water filtration and purification means, and furthermore, in the preferred embodiment will also include UV light to provide further purification. Specifically, and turning to FIG. 3, the preferred embodiment of the filtration assembly includes at least a first water filter 50', such as a carbon filter tube, and a second water filter 50", such as a UV light filter. Additionally, in yet another embodiment depicted in FIG. 4, a sediment filter 50''' may also be provided and disposed preferably in line with the first water filter 50'. Specifically, some types of filters, such as carbon filters, when provided with an elongate configuration, as is preferred with the present invention, become gradually used up as contaminants are gathered along the length thereof. Unfortunately, however, if larger sediment particles are present in the fluid being filtered, an eventual clogging of the filter can take place at or near the inlet such that less than all of the water filter 50' is used up when replacement of the clogged filter must take place. For this reason, the present invention further includes a sediment filter 50''' disposed in line with the first water filter 50'. This sediment filter 50''' collects and filters out larger contaminants from the water, such that when the water passes through the first water filter 50', it is already partially purified and the carbon type filter can achieve more extensive, fine filtration of the water. Also, if desired, a coarse filter can also be provided even before the sediment filter.

Moreover, if desired, the pump 52 and one or more water filters 50' and 50" may be disposed in generally closely spaced relation with one another within an insulation assembly 51. For example, the insulation assembly 51 may include a foam lined container which encloses and contains the pump 52 and water filters 50' and 50", thereby insulating them from moisture and condensation which can build up during the water formation. Indeed, it is noted that with the excess moisture that is naturally present within the machine 10 of the present invention, various components, and especially the electrical pump, can be susceptible to corrosion and deterioration. As such, the insulation assembly 51, if used, keeps out moisture, dirt and condensation, providing only for the fluid flow conduits to pass into and out of the enclosed insulation assembly 51. As a further convenience, in the preferred embodiment, the insulation assembly 51, and therefore the pump 52 and any water filters contained therein, may be removably coupled to the primary housing 20 in a manner which facilitates removal, repair and/or replacement of the various components. In particular, it is noted that the pump may require routine maintenance procedures and the water filters must be cleaned and or replaced on a regular basis. As such, a service technician can arrive at a machine 10 with a replacement insulation assembly 51, can uncouple the water flow conduits and other minor connections to release the insulation assembly and replace it with a fresh one. Of course, if desired, the water filters may be independently removable from the insulation assembly 51 if more frequent replacement is necessary, and/or the water filters may be disposed within their own insulation assembly so as to provide for independent removal.

Extending from the water filter 50 is a further conduit 54 which permits the water to be pumped from the water filter 50 into a delivery coil 55. Moreover, the delivery coil 55 is structured to contain a quantity of filtered water in a ready to dispense orientation such that a user need not wait for completion of the filtration process. Indeed, some form of level indication may be provided such that when water is depleted from the delivery coil 55, the pump 52 draws more water from the fluid reservoir for filtration.

As it is preferred that the water dispensed from the water collection and dispensing machine 10 of the present invention be cool, further included within the primary housing 20 is a cooling assembly structured to maintain the water at a predetermined cooled temperature. Although a second refrigeration system may also be incorporated within the primary housing 20, in the preferred embodiment the fluid reservoir 45 is lined with a plurality of thermal electric cold plates 57. These thermal electric cold plates 57 function to maintain the water in the fluid reservoir 45 substantially cool without requiring the added noise, cost and energy of a separate refrigeration system solely for water cooling purposes. Additionally, so as to maximize the cooling effects of the cold plates 57, the delivery coil 55 is preferably structured to be maintained submerged beneath the water level within the fluid reservoir 45. Moreover, the delivery coil 55 will preferably be constructed of a temperature conductive material, such as copper so that the purified water maintained therein is maintained cool as a result of its presence in the cool environment of the fluid reservoir 45.

With either cooling assembly, it is preferred that constant cooling not be permitted so as to prevent icing or freezing within the machine 10. As such, a cooling operation of the cooling assembly is regulated by a temperature detection assembly. The temperature detection assembly is structured to detect a temperature of the water within the fluid reservoir 45. In the preferred embodiment, the temperature detection assembly includes a detection head 80. Preferably the detection head 80 is in the form of a thermistor, and although it may be placed outside the walls of the fluid reservoir 45 or merely in proximity to the water, it is preferred that the detection head be immersed within the water contained in the fluid reservoir. Specifically, it is noted that unless direct and accurate temperature detection is achieved, excessive or insufficient cooling can result, especially since the walls of the fluid reservoir 45 and the ambient air around the water will generally be at very different temperatures from the water. Because, however, the detection head 80 will generally be metallic, and accordingly will be susceptible to rusting or corrosion after extended periods of time submerged in water, the temperature detection assembly of the present invention further includes a shielding assembly 82. The shielding assembly 82 is structured to communicably shield the detection head 80 from the water so as to prevent rusting and deterioration thereof, while also permitting the temperature of the water to be accurately and readily detected by the detection head 80. In the preferred embodiment, the shielding assembly 82 includes an elongate tubular shaft, such as formed from plastic or another material which will not substantially hamper temperature detection, disposed in the fluid reservoir 45. Moreover, a distal end 83 of the shaft 82, wherein the detection head 80 is preferably disposed, is positioned at generally a lower region of the fluid reservoir so as to ensure that it will almost always be submerged in the water. Conversely, the proximal end 84 of the shaft 82 will be positioned generally above a fluid level within the fluid reservoir 45, and is preferably mounted to an upper surface of the fluid reservoir 45 so as to maintain a constant position of the shaft 82. Furthermore, the proximal end 84 of the shaft 82 preferably includes an opening wherethrough an elongate conductive element 85, such as a wire, which is connected with the detection head 80, may pass. For example, the detection head 80 is preferably communicably connected by the elongate conductive element 85 to a control assembly 86 of the temperature detection assembly so as to give the necessary temperature readings for subsequent direction of the cooling of the cooling assembly by the control assembly 86.

Looking further to the delivery coil 55, it is preferably a substantially elongate coiled tube so that a substantial quantity of the purified water may be maintained therein in a ready to dispense orientation. Further, the outlet of the delivery coil 55 preferably includes a Y connection 60. The Y connector 60 is structured to permit water flow either to a dispensing spigot 65 or a return tube 68. Looking first to the dispensing spigot 65, it is connected to the delivery coil 55 by an elongate conduit 62. As a result of the pump 52 which pumps the water through the water filter 50 and into the delivery coil 55, the purified ready to dispense water is pumped up the conduit 62 to the dispensing spigot 65 and is ready to be dispensed when needed. Much like conventional water dispensing devices, the dispensing spigot 65 is preferably a conventional on/off type tap wherein a lever 64 is actuated so as to open up a valve within the dispensing spigot 65 and permit water to flow therefrom for effective dispensing. It should be understood, however, that any alternative means of dispensing could equivalently be employed. Extending from a second outlet of the Y connector 60 is a secondary conduit 63. This second conduit 63 is connected in fluid flow communication with the return tube 68 through valve assembly 70. The valve assembly 70 is specifically structured and disposed to open on a predetermined, regulated basis in order to permit selective cycling of the quantity of filtered water contained within the delivery coil 55 into the return tube 68. In particular, the return tube 68 is connected in fluid flow communication back to the fluid reservoir 45. As such, if after a predetermined period of time or after a predetermined number of uses, some purified water has remained within the delivery coil 55 for an extended period, that water is cycled back into the fluid reservoir 45. Such cycling ensures that the quantity of water that is ready to be dispensed within the delivery coil 55 is always freshly filtered and has not been allowed to be maintained within the delivery coil 55 for an extended period of time whereafter it may become stagnant or otherwise less desirable to drink. In the preferred embodiment the valve assembly 70 includes a timed solenoid valve structured to open based upon a predetermined timed cycle. For example, the solenoid valve 70 may be structured to either open every few minutes and direct the fluid back into the fluid reservoir 45, or to open if fluid has not been dispensed after a predetermined number of minutes through the dispensing spigot 65. Accordingly, water can be maintained constantly filtered.

As a further feature of the present invention, also included within the fluid reservoir 45 is preferably a fluid level detection assembly 49. Specifically, the fluid level detection assembly 49 is structured and disposed to detect whether a level of water within the fluid reservoir 45 is too high or too low and correspondingly regulate operation of the machine. For example, if the water level drops too low it may serve as an indication for the shutdown of the thermal cold plates 57, such that energy is not wasted, and can initiate an extended water producing cycle to refill the fluid reservoir 45 back to an acceptable level. More commonly, however, the fluid level detection assembly will preferably function to detect when a fluid level is reaching the maximum capacity of the fluid reservoir 45. As a result, when that water level is detected as being too high, the air blower 30 and dehumidifier refrigerant assembly will not need to operate to produce further water. Such a configuration saves electricity and ensures that operation does not result in an overflow of the fluid reservoir 45. Furthermore, so as to maintain maximum efficiency of the dehumidifier refrigerant assembly, it also includes a recycling assembly. Specifically, the recycling assembly is structured to recycle the cold liquid from the evaporator coil 40 and direct it back to the compressor 35 in the form of refrigerant gas once again. As such, the recycling assembly includes a return conduit 72 which directs the cold liquid 40 from the evaporator coil into the compressor 35, permitting the cold liquid to return to its normal refrigerant gas state whereafter the cycle may repeat itself beginning at the compressor 35. Additionally, if necessary, the back surface of the primary housing 20 may include a refrigerant system static condenser 75. This static condenser 75 may be used either as a condenser coil for a secondary refrigeration cycle used to cool the water within the fluid reservoir 45, or to provide for the return of the cold liquid from the evaporator coil 40 to the condenser 35 therethrough so as to further facilitate its return to its conventional refrigerant gas state.

It is therefore seen that given the specific structure of the water collection and dispensing machine 10 of the present invention, the production of water is substantially facilitated, without requiring large water bottles be implemented, in a substantially quite and efficient manner.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A water collection and dispensing machine comprising:
   an evaporator coil structured to cycle a cold refrigerant liquid there through,
   an air blower structured to draw air over said evaporator coil such that moisture condenses on an exterior of said evaporator coil,
   a fluid collection assembly structured to collect said moisture, in the form of water droplets, from said evaporator coil,
   said fluid collection assembly including a fluid reservoir structured and disposed to contain said collected water for dispensing,
   a filtration assembly structured and disposed to receive and filter said collected water prior to dispensing, said filtration assembly comprising:
      a sediment filter structured to receive a flow of said collected water therethrough and to remove sediment particulate from said collected water, and
      a water filter structured to receive said flow of said collected water there through prior to dispensing of said collected water.

2. A water collection and dispensing machine as recited in claim 1 wherein said water filter is disposed downstream of said sediment filter.

3. A water collection and dispensing machine as recited in claim 1 wherein filtration assembly further includes a UV light filter structured to further purify said collected water prior to dispensing.

4. A water collection and dispensing machine as recited in claim 1 wherein said water filter includes a carbon filter.

5. A water collection and dispensing machine as recited in claim 4 wherein said carbon filter is removably disposed inline with said sediment filter.

6. A water collection and dispensing machine as recited in claim 1 wherein said filtration assembly includes a delivery coil structured to contain a quantity of said collected water after filtration thereof in a ready to dispense orientation.

7. A water collection and dispensing machine as recited in claim 6 further including a dispensing spigot connected with said delivery coil and structured to selectively dispense the quantity of water from said delivery coil,
   a return tube, said delivery coil being connected in fluid flow communication with said dispensing spigot and said return tube, and
   said return tube being connected in fluid flow communication with said fluid reservoir and including a valve assembly structured and disposed to open on a predetermined, regulated basis in order to selectively cycle said quantity of filtered collected water back into said fluid reservoir and thereby ensure that water in said delivery coil is fresh.

8. A water collection and dispensing machine as recited in claim 6 wherein said delivery coil is disposed in said fluid reservoir such that the quantity of water contained therein is maintained cold.

9. A water collection and dispensing machine as recited in claim 1 further including a UV light filter disposed downstream of said water filter and structured to further purify said collected water prior to dispensing.

10. A water collection and dispensing machine as recited in claim 1 further comprising a cooling assembly structured to cool said water disposed in said fluid reservoir.

11. A water collection and dispensing machine comprising:
   an evaporator coil structured to cycle a cold refrigerant liquid there through,
   an air blower structured to draw air over said evaporator coil such that moisture condenses on an exterior of said evaporator coil,
   a fluid collection assembly structured to collect said moisture, in the form of water droplets, from said evaporator coil,
   said fluid collection assembly including a fluid reservoir structured and disposed to contain said collected water for dispensing,
   a filtration assembly structured and disposed to receive and filter said collected water prior to dispensing, said filtration assembly comprising:
      a sediment filter, a water purification filter and a UV light filter disposed in line with one another and structured to receive a flow of said collected water there through and to purify said collected water and remove sediment particulate therefrom.

12. A water collection and dispensing machine as recited in claim 11 further comprising a housing in which said filtration assembly is contained, said sediment filter, said water purification filter and said UV light filter each being at least partially removable from said housing after a period of use.

* * * * *